United States Patent
Mankude

(10) Patent No.: US 10,162,832 B1
(45) Date of Patent: Dec. 25, 2018

(54) DATA AWARE DEDUPLICATION

(71) Applicant: Talena, Inc., Milpitas, CA (US)

(72) Inventor: Hariprasad Bhasker Rao Mankude, San Ramon, CA (US)

(73) Assignee: Imanis Data, Inc., San Jose, CA (US)

( * ) Notice: Subject to any disclaimer, the term of this patent is extended or adjusted under 35 U.S.C. 154(b) by 385 days.

(21) Appl. No.: 14/866,047

(22) Filed: Sep. 25, 2015

Related U.S. Application Data

(60) Provisional application No. 62/055,395, filed on Sep. 25, 2014.

(51) Int. Cl.
  *G06F 17/00* (2006.01)
  *G06F 17/30* (2006.01)

(52) U.S. Cl.
  CPC .. *G06F 17/30159* (2013.01); *G06F 17/30076* (2013.01)

(58) Field of Classification Search
  CPC .............. G06F 17/30159; G06F 17/30076
  USPC ........................................... 707/692
  See application file for complete search history.

(56) References Cited

U.S. PATENT DOCUMENTS

| | | | | |
|---|---|---|---|---|
| 7,539,710 | B1 * | 5/2009 | Haustein | G06F 11/1453 |
| 8,694,466 | B2 * | 4/2014 | Rao | G06F 17/30038 |
| | | | | 382/232 |
| 8,799,245 | B2 * | 8/2014 | Amarendran | G06F 17/30221 |
| | | | | 707/694 |
| 9,779,177 | B1 * | 10/2017 | Reiner | G06F 17/30943 |
| 2010/0198797 | A1 * | 8/2010 | Wideman | G06F 17/30156 |
| | | | | 707/692 |
| 2010/0235333 | A1 * | 9/2010 | Bates | G06F 17/30156 |
| | | | | 707/692 |
| 2010/0306176 | A1 * | 12/2010 | Johnson | G06F 17/30085 |
| | | | | 707/664 |
| 2011/0320865 | A1 * | 12/2011 | Jain | G06F 11/1088 |
| | | | | 714/6.22 |
| 2012/0158672 | A1 * | 6/2012 | Oltean | G06F 17/3007 |
| | | | | 707/692 |
| 2013/0144845 | A1 * | 6/2013 | Ghuge | G06F 17/3015 |
| | | | | 707/692 |
| 2013/0198150 | A1 * | 8/2013 | Kim | G06F 17/30159 |
| | | | | 707/692 |
| 2013/0246372 | A1 * | 9/2013 | Rao | G06F 17/3015 |
| | | | | 707/692 |

(Continued)

OTHER PUBLICATIONS

Tan, Yujuan, et al., "SAM: A Semantic-Aware Multi-Tiered Source De-duplication Framework for Cloud Backup", ICPP—2010, San Diego, CA, Sep. 13-16, 2010, pp. 614-623.*

(Continued)

*Primary Examiner* — Robert Stevens
(74) *Attorney, Agent, or Firm* — Brokaw Patent Law PC; Christopher J. Brokaw

(57) ABSTRACT

Approaches for reducing a storage footprint for one or more files. A file type associated with a digital file is determined. A deduplication process is performed on the digital file based, at least in part, on the determined file type. The deduplication process may be performed differently on the digital file based on whether the digital file is an image or audio file, a compressed file, or a columnar file, for example. By considering the type of file being deduplicated, enhanced reductions in the storage footprint of the digital file may be realized.

26 Claims, 3 Drawing Sheets

(56) References Cited

U.S. PATENT DOCUMENTS

| | | | | |
|---|---|---|---|---|
| 2013/0339848 A1* | 12/2013 | Patil | ................. | G06F 17/30156 715/255 |
| 2014/0095439 A1* | 4/2014 | Ram | ................. | G06F 17/30159 707/640 |
| 2015/0006475 A1* | 1/2015 | Guo | ................. | G06F 17/30159 707/609 |

OTHER PUBLICATIONS

Fu, Yinjin, et al., "Application-Aware Local-Global Source Deduplication for Cloud Backup Services of Personal Storage", IEEE Transactions on Parallel and Distributed Systems, vol. 25, No. 5, May 2014, pp. 1155-1165.*

Chen, Ming, "A High-precision Duplicate Image Deduplication Approach", Journal of Computers, vol. 8, No. 8, Nov. 2013, pp. 2768-2775.*

Meng, Haiyan, et al., "MMSD: a Metadata-Aware Multi-Tiered Source Deduplication Cloud Backup System in the Personal Computing Environment", IRECOS, vol. 8, No. 2, Feb. 2013, pp. 542-550.*

Kolb, Lars, et al., "Dedoop: Efficient Deduplication with Hadoop", Proc. of the VLDB, vol. 5, No. 12, © 2012, pp. 1878-1881.*

Geer, David, "Reducing the Storage Burden via Data Deduplication", Computer, vol. 41, No. 12, Dec. 2008, pp. 15-17.*

Efstathopoulos, Petros, "File Routing Middleware for Cloud Deduplication", CloudCP 2012, Bern, Switzerland, Apr. 10, 2012, Article 10, 6 pages.*

Fu, Y. J., et al., "Application-Aware Client-Side Data Reduction and Encryption of Personal Data in Cloud Backup Services", Journal of Computer Science and Technology, vol. 28, No. 6, Nov. 2013, pp. 1012-1024.*

Sidirourgos, Lefteris, "Column Imprints: A Secondary Index Structure", SIGMOD '13, New York, NY, Jun. 22-27, 2013, pp. 893-904.*

Yan, Fang, et al., "A Method of Object-based De-duplication", Journal of Networks, vol. 6, No. 12, Dec. 2011, pp. 1705-1712.*

* cited by examiner

DATA AWARE DEDUPLICATION

CLAIM OF PRIORITY

This application claims priority to U.S. Provisional Patent Application No. 62/055,395, entitled "Data Aware Deduplication," invented by Hariprasad Bhasker Rao Mankude, filed on Sep. 25, 2014, the contents of which are hereby incorporated by reference for all purposes as if fully set forth herein.

FIELD OF THE INVENTION

Embodiments of the invention relate to reducing a storage footprint for one or more files stored on one or more persistent storage mediums.

BACKGROUND

Deduplication is a technique commonly used in the computer storage industry to reduce the storage footprint by removing common portions of files. Deduplication is typically performed by scanning entire files, creating chunks of smaller size within the scanned files, and thereafter creating a fingerprint for the byte stream in each of the chunks within a file. The fingerprint for each chuck of a file is then compared against a fingerprint database. The fingerprint database stores fingerprints for previously processed chunks of files.

If a particular fingerprint created for a chunk ("chunk X") is not present in the fingerprint database, then that particular fingerprint is unique (i.e., it has not been previously encountered) and the fingerprint, and information about its association to chunk X, is stored in the fingerprint database. On the other hand, if the fingerprint is already present in the fingerprint database, then this means that chunk X is considered to be a duplicate of another chunk ("chunk Y") already represented by another fingerprint stored in the fingerprint database; consequently, a pointer reference is saved that associates the previously stored fingerprint (which is also associated with chunk Y) to chunk X.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for reducing a storage footprint for one or more files are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

FUNCTIONAL OVERVIEW

Embodiments of the invention permit the storage footprint of one or more digital files to be reduced more effectively and efficiently than in prior approaches. Approaches are discussed herein for achieving improved storage savings by using deduplication techniques that consider the file type of the files being processed. By applying different deduplication techniques based on the file type or other file characteristics of the files being deduplicated, enhanced reductions in the storage footprint for one or more files may be realized.

Figure 1:
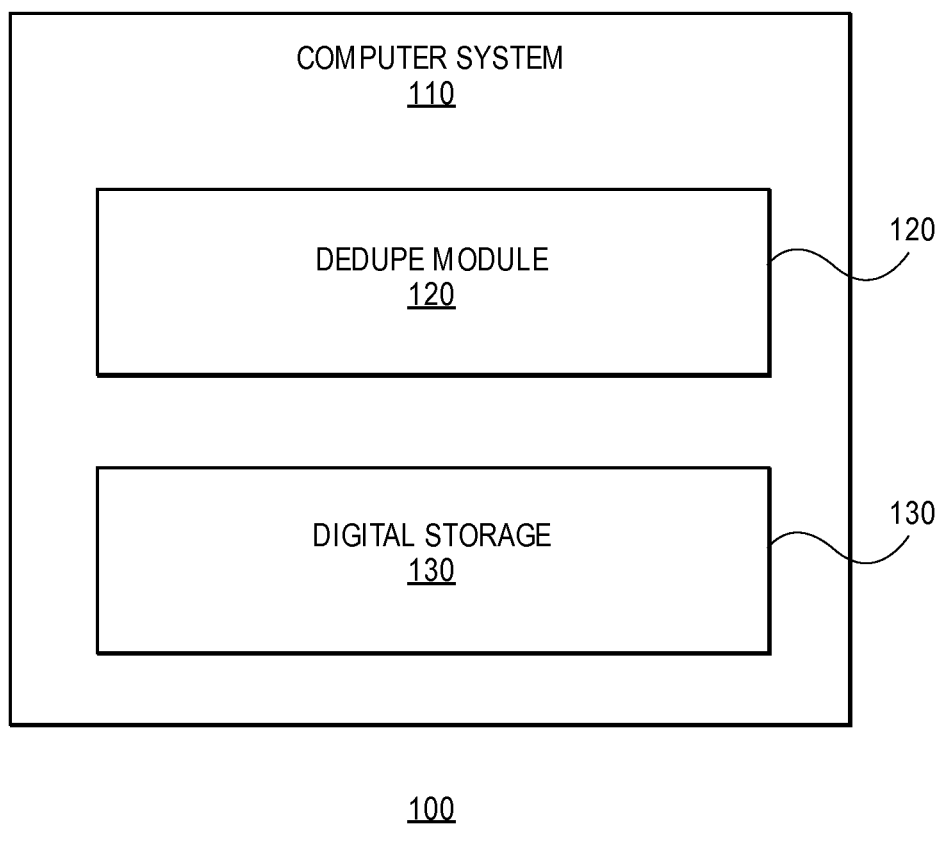
FIG. 1 is a block diagram of a system on which deduplication may be performed according to different embodiment of the invention.

FIG. 1 is a block diagram of a system 100 on which deduplication may be performed according to embodiments of the invention. System 100 may correspond to a wide variety of computer systems, such as computer system 300 discussed in further detail below in reference to FIG. 3. System 100 may correspond to any type of computer system which may comprise one or more of dedupe module 120 and digital storage 130.

As broadly used herein, dedupe module 120 refers to one or more software processes which perform the steps described below in reference to FIG. 2. Dedupe module 120 may operate at a variety of different computational levels, e.g., dedupe module 120 may correspond to application level software or may be incorporated into, or operate as part of, an operating system.

Digital storage 130 refers to any medium or mechanism for storing digital data. Digital storage 130 will typically be, but need not be in all embodiments, persistent storage. Non-limiting, illustrative examples of digital storage 130 include a hard-disk drive (HDD) or a solid state device (SSD), such as a flash drive.

Digital storage 130 may store a wide variety of different types of files. For example, digital storage 130 may store files corresponding to uncompressed documents. Digital storage 130 may also store files that are expressed using a compressed format such as bzip2, gzip, snappy, lzo, lz4, and lzma. Files with proprietary formats, such as a columnar format used by a database, may also be stored in digital storage 130. Several examples of columnar formats include the RCFile format, the ORC format, the Parquet format and the Vertica format. Digital storage 130 may also store files conforming to a well-defined file format, such as weblogs or application logs. Digital storage 130 may also store image and audio files as well. Non-limiting examples of image file formats include jpeg and mpeg; non-limiting examples of audio file formats include .wav and .mp3.

Figure 2:
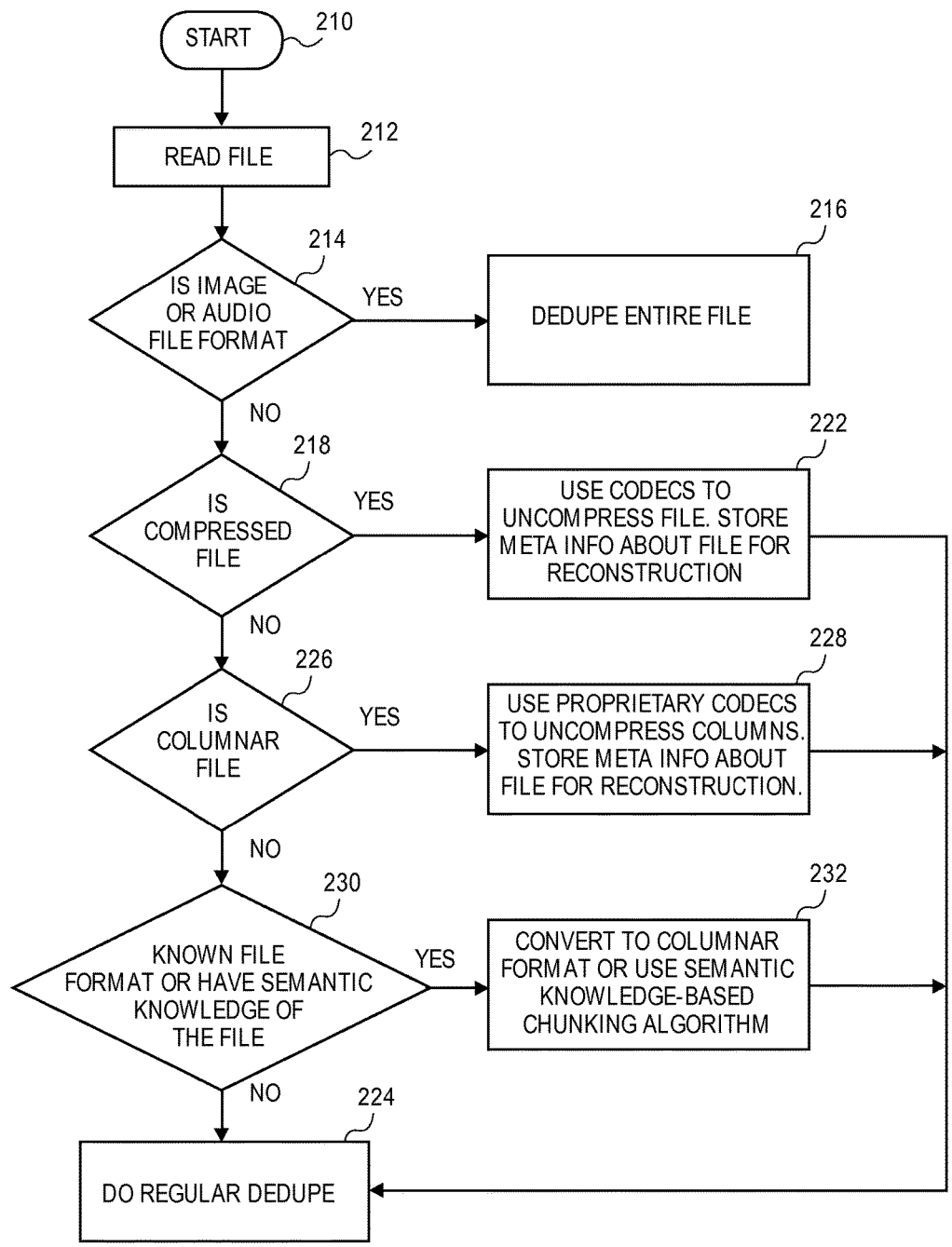
FIG. 2 is a flowchart of the process for reducing a storage footprint for one or more files according to one embodiment of the invention.

While FIG. 1 depicts digital storage 130 residing on the same system 100 as dedupe module 120, embodiments of the invention permit dedupe module 120 to perform the steps of FIG. 2 upon data stored in a digital storage physically residing on a separate machine or device than the machine or device on which dedupe module 120 resides. For example, in an embodiment, dedupe module 120 may communicate with digital storage 130 over a network.

Reducing the Storage Footprint of Digital Files

FIG. 2 is a flowchart of the process for reducing a storage footprint for one or more files according to one embodiment of the invention. The steps of FIG. 2 may be performed in response to a user initiating a deduplication process. Alternately, dedupe module 120 may expose an interface to allows a user to configure when the steps of FIG. 2 are performed, e.g., the initiation of the steps of FIG. 2 may be performed after the occurrence of an event, a threshold, at a particular time, or after a certain specified amount of time has passed since the last time a deduplication process was performed.

The steps of FIG. 2 shall be explained below in reference to a process performed on a single file. It should be understood that the process of FIG. 2 may be performed repeatedly upon a plurality of files so that the storage footprint for the plurality of files may be reduced.

In step 210, dedupe module 120 initializes data structures in preparation of reading a particular file stored in digital storage 130. The data structures initialized in step 210 may be used to store information used in the performance of a deduplication process. The data structures initialized in step 210 may also be used to identify the particular file being processed by the steps of FIG. 2. For example, a data structure may correspond to a file pointer that identifies or references the file being deduped in FIG. 2.

In step 212, dedupe module 120 reads a particular file stored in digital storage 130. When reading a file, dedupe module 120 will initially read the file name and thereafter read the file header of the file to ascertain a file type for the file being read. In step 214, dedupe module 120 determines if the file is expressed in an image or audio file format. If, in step 214, dedupe module 120 determines that the file is expressed in an image or audio file format, then processing proceeds to step 216 as shown in FIG. 2.

In step 216, dedupe module 120 performs a deduplication process upon the entire file. In performing step 216, a fingerprint may be generated for the entire file, rather than a proper subset of the file, such as a chunk of a size smaller than the entire file. This generated fingerprint may be compared to other fingerprints generated by system 100 to determine if there is a match. If a match is found, metadata for the previously generated matching fingerprint is updated to identify the file. Fingerprints may be stored in digital storage 130 or in other persistent storage mediums by embodiments of the invention. In an embodiment, fingerprints may be stored in a central repository (not depicted in FIG. 1) accessible to system 100 over a network.

If, in step 214, dedupe module 120 determines that the file is not expressed in an image or audio file format, then processing proceeds to step 218 as shown in FIG. 2. In step 218, dedupe module 120 determines whether the file is compressed. Dedupe module 120 may determine whether the file being read is compressed by examining the file extension of the file. For example, certain compressed file formats (such as but not limited to bz2, gzip, snappy, lz4, zip, and lzma) have identifiable file extensions. If the file is in a compressed format, then processing proceeds to step 222.

In step 222, dedupe module 120 initializes an appropriate compression codec and thereafter reads the file. If, with the aid of the appropriate compression codec, dedupe module 120 determines that the file is not correctly formatted, then the file is subsequently treated as a regular file and processing proceeds to step 224 as shown in FIG. 2. On the other hand, if, with the aid of the appropriate compression codec, dedupe module 120 can read the file, then the file is uncompressed. Compression algorithms generally reformat and relay the file to achieve the best compression results; however, this has the unfortunate side effect of causing two nearly identical uncompressed bytestreams to become entirely different after being compressed. Thus, deduping compressed files often result in poor compression ratios.

Continuing in step 222, after the file is uncompressed, metadata is stored in a global database or central repository to indicate the original compression format for the file. Thereafter, processing proceeds to step 224 as dedupe module 120 (or potentially another software entity such as a chunking layer) converts the uncompressed file into a stream of bytes. From that stream of bytes, dedupe module 120 (or potentially another software entity such as a chunking layer) creates contiguous chunks of data by searching for some predefined bit patterns. Fingerprints are computed on these chunks using a cryptographic hashing algorithm (such as SHA-2 for example). The computed fingerprints are matching against a global database or central repository. If a match is found in the global database or central repository, then the computed fingerprint is considered to be a duplicate and metadata for the previously stored matching fingerprint is updated to add a reference to this duplicate chunk by adding the filename and path to the metadata as the reference. On the other hand, if a match is not found in the global database for the computed fingerprint, then the computed fingerprint is deemed to be associated with a unique chunk and the newly computed fingerprint is added to the global database.

If the determination of step 218 indicates that the file is not in a compressed format, then processing proceeds to step 226. In step 226, dedupe module 120 determines whether the file is expressed in a columnar format. Dedupe module 120 may determine whether the file is expressed in a columnar format by reading the initial header of the file. If dedupe module 120 determines in step 226 that the file is expressed in a columnar format, then processing proceeds to step 228 as shown in FIG. 2.

In step 228, dedupe module 120 uses an appropriate codec (which may be proprietary) to read the columns of the columnar file. Thereafter, with the aid of the appropriate codec, dedupe module 120 uncompresses the columns of the file. After the file is uncompressed, dedupe module 120 (or potentially another software entity such as a chunking layer) converts the file into a stream of bytes. In addition, metadata is stored in the global database to indicate the original compression format for the file. Thereafter, processing proceeds to step 224. From the stream of bytes created in step 222, dedupe module 120 (or potentially another software entity such as a chunking layer) creates contiguous chunks of data by searching for some predefined bit patterns. Thereafter, fingerprints are computing on these chunks using a cryptographic hashing algorithm (such as SHA-2 for example). The computed fingerprints are matching against a global database or central repository. If a match is found in the global database or central repository, then the computed fingerprint is considered to be a duplicate and metadata for the previously stored matching fingerprint is updated to add a reference to this duplicate chunk by adding the filename and path to the metadata as the reference. On the other hand, if a match is not found in the global database for the newly computed fingerprint, then the computed fingerprint is deemed to be associated with a unique chunk and the computed fingerprint is added to the global database or central repository.

If, step 226, dedupe module 120 determines that the file is not expressed in a columnar format, then processing proceeds to step 230 as shown in FIG. 2. In step 230, dedupe module 120 determines whether the file is expressed in a particular known file format, such as a weblog format or an application log format. Embodiments of the invention may allow a user to specify which one or more particular known file formats are identified in step 230.

An example of a known content format or semantic knowledge of a file is a file which has rows of data as <user name, IP address, timestamp, website address, status>. Here, columnar conversion will place all <user name> information from all the rows sequentially. The <user name> information will be followed by <IP address> information from all the rows, then followed by <timestamp> information, then followed by <website information>, and then followed by <status> information from all the rows. Relaying the file in this columnar format will improve the deduplication ratio, thereby reducing the storage footprint. Metadata to reconvert the file back to the original format may be stored separately. After the file is relayed in a columnar format, then dedupe module 120 performs a deduplication process on the file (referred to as semantic deduplication) relayed in a columnar format in step 224 as shown in FIG. 2.

Another example of a known content format or semantic knowledge of a file is the SSTable format used by the Cassandra database, which is an open source distributed database. If the file is determined to be expressed in a SSTable format, dedupe module 120 will employ a different mechanism to create chunks of data. Instead of considering the file to be a stream of bytes, the SSTable format will be leveraged to identify the rows and columns. With this knowledge, dedupe module 120 may create the chunks by adding the rows and columns until a predetermined size is exceeded. For example, if the predetermined size is 16384 bytes, all the rows and columns associated with these rows are added to a buffer until 16384 bytes is exceeded, subsequently this buffer would be the chunk. Fingerprinting is again done using SHA-2 algorithm and computed fingerprint is compared against the global database to determine whether the fingerprint is unique or not. This is another example of semantic deduplication.

If dedupe module 120 determines that the file is expressed in a particular known file format is step 230, then processing proceeds to step 232 as shown in FIG. 2. In step 232, the file is converted by dedupe module 120 into a columnar format so that similar data is located next to each other. After the file is relayed in a columnar format, then dedupe module 120 performs a deduplication process on the file is relayed in a columnar format in step 224 as shown in FIG. 2.

In step 224, dedupe module 120 performs a deduplication process upon the file. As shown in FIG. 2, there are multiple paths to step 224. If dedupe module 120 determines that the file does not possess any of criteria or file formats checked for in steps 214, 218, 226, and 230, then the deduplication process of step 230 may be performed on file without modifying the file. However, as shown in FIG. 2, if the file meets any particular criterion or file format checked for in one of steps 214, 218, 226, and 230, then semantic deduplication may be performed on the file. Thus, before performing the semantic deduplication process in step 224, the file is modified or converted as discussed above to improve the effectiveness and efficiency of the deduplication process performed in step 224.

In response to the deduplicated file being read, embodiments of the invention enable the reconstruction of the file in the file's original format so that the read operation may be performed. The file may be reconstructed in its original format using the stored metadata that describes the conversion of the file from its original format to the format on which the deduplication process was performed.

Advantageously, embodiments of the invention may perform a deduplication process on a file differently based, at least in part, on the file type of the file. By considering the type of file being deduplicated, enhanced reductions in the storage footprint of the digital file may be realized as described above.

Hardware Mechanisms

Figure 3:
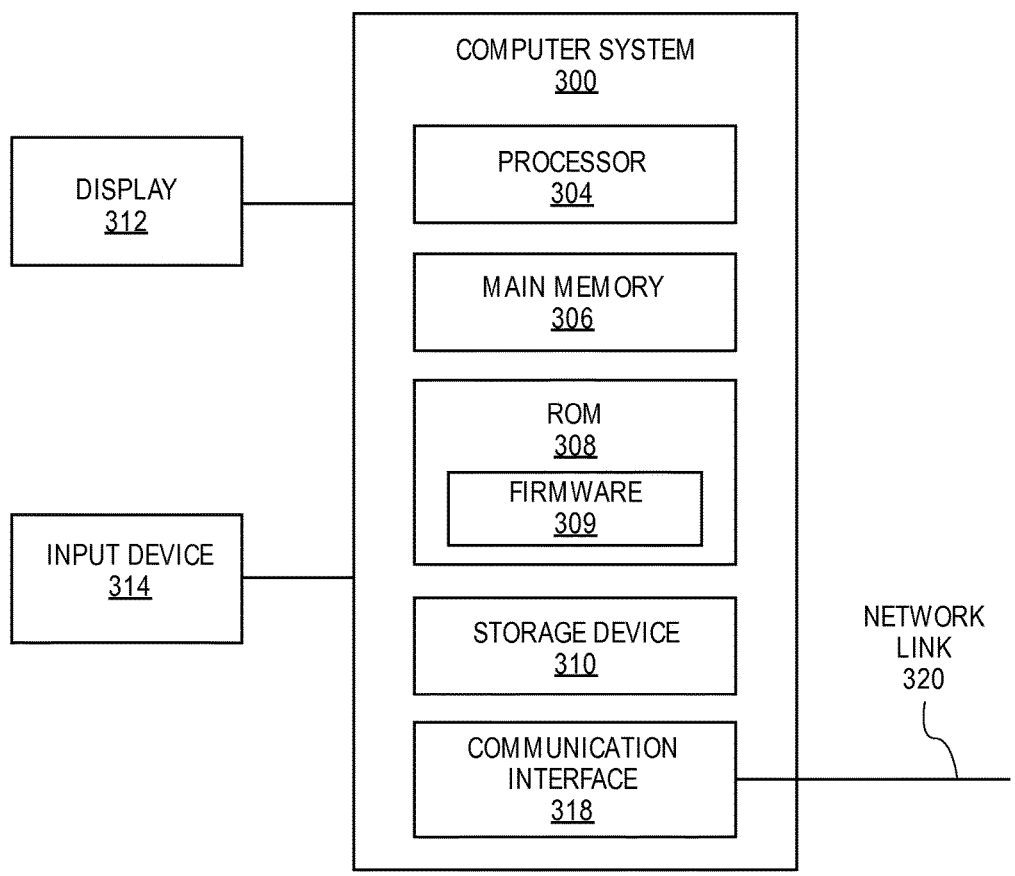
FIG. 3 is a block diagram that illustrates the hardware components of a computer system upon which an embodiment of the invention may be implemented.

In an embodiment, system 100 may correspond to a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for reducing a storage footprint for one or more files, which when executed by one or more processors, cause:
    a software process determining a file type associated with a digital file using inspection of a file header of the digital file;
    the software process identifying a particular deduplication process, from among a plurality of different deduplication processes available to said software process, to be performed upon said digital file based, at least in part, on said determined file type of said digital file; and
    the software process performing said particular deduplication process on the digital file, wherein the software process uses said determined file type to determine whether a semantic deduplication process is performed as part of said particular deduplication process.

2. The one or more non-transitory machine-readable storage mediums of claim 1, wherein said determined file type is an image or audio file format.

3. The one or more non-transitory machine-readable storage mediums of claim 1, wherein execution of the one or more sequences of instructions further cause:
    upon the software process determining that the digital file is expressed in an image or audio file format, then the software process performing the deduplication process on the entire digital file;
    upon the software process determining that the digital file is not expressed in an image or audio file format, then the software process determining whether the digital file is a compressed file; and
    the software process performing said deduplication process on a digital file based, at least in part, on whether the digital file is determined to be a compressed file.

4. The one or more non-transitory machine-readable storage mediums of claim 1, wherein execution of the one or more sequences of instructions further cause:
    upon the software process determining that the digital file is a compressed file, then the software process performing:
        uncompressing said digital file to obtain an uncompressed digital file;
        storing reconstruction information for said uncompressed digital file; and
        performing said deduplication process on said uncompressed digital file.

5. The one or more non-transitory machine-readable storage mediums of claim 1, wherein execution of the one or more sequences of instructions further cause:
    upon the software process determining that the digital file is a columnar file, then the software process performing:
        uncompressing a compressed column of said digital file to obtain an uncompressed column of said digital file;
        storing reconstruction information for said digital file; and
        performing said deduplication process on said digital file.

6. The one or more non-transitory machine-readable storage mediums of claim 1, wherein execution of the one or more sequences of instructions further cause:
    upon the software process determining that the digital file is expressed in a preidentified file format, then the software process performing:
        converting said digital file from being expressed in said preidentified file format to being expressed in a columnar format;
        storing reconstruction information for said digital file; and
        performing said deduplication process on said digital file.

7. The one or more non-transitory machine-readable storage mediums of claim 6, wherein said particular file format is a weblog file format or an application log format.

8. The one or more non-transitory machine-readable storage mediums of claim 1, wherein execution of the one or more sequences of instructions further cause:

after the software process performs said deduplication process on the digital file, reconstructing said digital file from being expressed in a current format to an original format using metadata that was generated during said deduplication process.

9. The one or more non-transitory machine-readable storage of claim 1, wherein execution of the one or more sequences of instructions further cause:
upon the software process determining that said determined file type for the digital file is a first particular file type, then the software process creating a chunk for the digital file using a first method; and
upon the software process determining that said determined file type for the digital file is a second particular file type, then the software process creating a chunk for the digital file using a second method different than said first method, and wherein said second method comprises (a) identifying rows and columns within the digital file, and (b) adding data organized according to said rows and columns from within said digital file into a buffer until a predetermined size is met or exceeded to perform semantic deduplication.

10. The one or more non-transitory machine-readable storage mediums of claim 1, wherein the software process identifying said particular deduplication process comprises performing a different deduplication process based on whether said determined file type is an image file type, an audio file type, a compressed file type, or a columnar file type.

11. An apparatus for reducing a storage footprint for one or more files, comprising:
one or more processors; and
one or more non-transitory machine-readable storage mediums storing one or more sequences of instructions, which when executed by the one or more processors, cause:
a software process determining a file type associated with a digital file using inspection of a file header of the digital file;
the software process identifying a particular deduplication process, from among a plurality of different deduplication processes available to said software process, to be performed upon said digital file based, at least in part, on said determined file type of said digital file; and
the software process performing said particular deduplication process on the digital file, wherein the software process uses said determined file type to determine whether a semantic deduplication process is performed as part of said particular deduplication process.

12. The apparatus of claim 11, wherein said determined file type is an image or audio file format.

13. The apparatus of claim 11, wherein execution of the one or more sequences of instructions further cause:
upon the software process determining that the digital file is expressed in an image or audio file format, then the software process performing the deduplication process on the entire digital file;
upon the software process determining that the digital file is not expressed in an image or audio file format, then the software process determining whether the digital file is a compressed file; and
the software process performing said deduplication process on a digital file based, at least in part, on whether the digital file is determined to be a compressed file.

14. The apparatus of claim 11, wherein execution of the one or more sequences of instructions further cause:
upon the software process determining that the digital file is a compressed file, then the software process performing:
uncompressing said digital file to obtain an uncompressed digital file;
storing reconstruction information for said uncompressed digital file; and
performing said deduplication process on said uncompressed digital file.

15. The apparatus of claim 11, wherein execution of the one or more sequences of instructions further cause:
upon the software process determining that the digital file is a columnar file, then the software process performing:
uncompressing a compressed column of said digital file to obtain an uncompressed column of said digital file;
storing reconstruction information for said digital file; and
performing said deduplication process on said digital file.

16. The apparatus of claim 11, wherein execution of the one or more sequences of instructions further cause:
upon the software process determining that the digital file is expressed in a preidentified file format, then the software process performing:
converting said digital file from being expressed in said preidentified file format to being expressed in a columnar format;
storing reconstruction information for said digital file; and
performing said deduplication process on said digital file.

17. The apparatus of claim 16, wherein said particular file format is a weblog file format or an application log format.

18. The apparatus of claim 11, wherein execution of the one or more sequences of instructions further cause:
after the software process performs said deduplication process on the digital file, reconstructing said digital file from being expressed in a current format to an original format using metadata that was generated during said deduplication process.

19. A method for reducing a storage footprint for one or more files, comprising:
a software process determining a file type associated with a digital file using inspection of a file header of the digital file;
the software process identifying a particular deduplication process, from among a plurality of different deduplication processes available to said software process, to be performed upon said digital file based, at least in part, on said determined file type of said digital file; and
the software process performing said particular deduplication process on the digital file, wherein the software process uses said determined file type to determine whether a semantic deduplication process is performed as part of said particular deduplication process.

20. The method of claim 19, wherein said determined file type is an image or audio file format.

21. The method of claim 19, further comprising:
upon the software process determining that the digital file is expressed in an image or audio file format, then the software process performing the deduplication process on the entire digital file;

upon the software process determining that the digital file is not expressed in an image or audio file format, then the software process determining whether the digital file is a compressed file; and the software process performing said deduplication process on a digital file based, at least in part, on whether the digital file is determined to be a compressed file.

22. The method of claim 19, further comprising:

upon the software process determining that the digital file is a compressed file, then the software process performing:
- uncompressing said digital file to obtain an uncompressed digital file;
- storing reconstruction information for said uncompressed digital file; and
- performing said deduplication process on said uncompressed digital file.

23. The method of claim 19, further comprising:

upon the software process determining that the digital file is a columnar file, then the software process performing:
- uncompressing a compressed column of said digital file to obtain an uncompressed column of said digital file;
- storing reconstruction information for said digital file; and
- performing said deduplication process on said digital file.

24. The method of claim 19, further comprising:

upon the software process determining that the digital file is expressed in a preidentified file format, then the software process performing:
- converting said digital file from being expressed in said preidentified file format to being expressed in a columnar format;
- storing reconstruction information for said digital file; and
- performing said deduplication process on said digital file.

25. The method of claim 24, wherein said particular file format is a weblog file format or an application log format.

26. The method of claim 19, further comprising:

after the software process performs said deduplication process on the digital file, reconstructing said digital file from being expressed in a current format to an original format using metadata that was generated during said deduplication process.

\* \* \* \* \*